United States Patent
Park et al.

(10) Patent No.: US 10,815,322 B2
(45) Date of Patent: Oct. 27, 2020

(54) METALLOCENE SUPPORTED CATALYST AND METHOD FOR PREPARING POLYPROPYLENE USING THE SAME

(71) Applicant: LG Chem, Ltd., Seoul (KR)

(72) Inventors: Jong Woo Park, Daejeon (KR); Hye Kyung Lee, Daejeon (KR); Byung Seok Kim, Daejeon (KR); Sang Jin Jeon, Daejeon (KR); Jae Youp Cheong, Daejeon (KR); Hee Kwang Park, Daejeon (KR)

(73) Assignee: LG Chem, Ltd. (KR)

( * ) Notice: Subject to any disclaimer, the term of this patent is extended or adjusted under 35 U.S.C. 154(b) by 104 days.

(21) Appl. No.: 16/088,610

(22) PCT Filed: Oct. 11, 2017

(86) PCT No.: PCT/KR2017/011190
§ 371 (c)(1),
(2) Date: Sep. 26, 2018

(87) PCT Pub. No.: WO2018/097472
PCT Pub. Date: May 31, 2018

(65) Prior Publication Data
US 2019/0106516 A1    Apr. 11, 2019

(30) Foreign Application Priority Data

Nov. 22, 2016  (KR) .................. 10-2016-0155630
Jan. 16, 2017  (KR) .................. 10-2017-0007187

(51) Int. Cl.
| | | |
|---|---|---|
| *C08F 4/6592* | (2006.01) | |
| *C08F 110/06* | (2006.01) | |
| *C07F 17/00* | (2006.01) | |
| *C08F 2/02* | (2006.01) | |
| *C08F 4/659* | (2006.01) | |

(52) U.S. Cl.
CPC ............ *C08F 110/06* (2013.01); *C07F 17/00* (2013.01); *C08F 2/02* (2013.01); *C08F 4/65912* (2013.01); *C08F 4/65916* (2013.01); *C08F 2420/01* (2013.01)

(58) Field of Classification Search
CPC .. C07F 17/00; C08F 4/65927; C08F 4/65916; C08F 110/06
See application file for complete search history.

(56) References Cited

U.S. PATENT DOCUMENTS

| | | |
|---|---|---|
| 5,032,562 A | 7/1991 | Lo et al. |
| 5,525,678 A | 6/1996 | Mink et al. |
| 5,914,289 A | 6/1999 | Razavi |
| 6,350,830 B1 | 2/2002 | Gores et al. |
| 2005/0054520 A1 | 3/2005 | Hart et al. |
| 2006/0235171 A1 | 10/2006 | Lee et al. |
| 2011/0230622 A1 | 9/2011 | Nakano et al. |
| 2015/0183893 A1 | 7/2015 | Yang et al. |
| 2015/0259442 A1 | 9/2015 | Kallio et al. |
| 2016/0208028 A1 | 7/2016 | Choi et al. |
| 2016/0257703 A1 | 9/2016 | Park et al. |

FOREIGN PATENT DOCUMENTS

| | | |
|---|---|---|
| EP | 2722346 A1 | 4/2014 |
| JP | 2002504569 A | 2/2002 |
| JP | 5409294 B2 | 2/2014 |
| KR | 19990039714 A | 6/1999 |
| KR | 20040076965 A | 9/2004 |
| KR | 101116701 B1 | 3/2012 |
| KR | 20120076160 A | 7/2012 |
| KR | 20150037652 A | 4/2015 |
| KR | 20150091308 A | 8/2015 |
| KR | 101593175 B1 | 2/2016 |
| KR | 20160045433 A | 4/2016 |
| KR | 101631702 B1 | 6/2016 |
| WO | 04/076502 A1 | 9/2004 |
| WO | 2015095188 A1 | 6/2015 |

OTHER PUBLICATIONS

Alexey N. Ryabov et al: "Palladium-Catalyzed Cross-Coupling Reactions of Bromo-Substituted Group 4 Metallocenes", Organometallics, Jul. 13, 2009. vol. 28, No. 13, pp. 3614-3617, XP055442866.
Extended European Search Report including Written Opinion for Application No. EP17872934.9 dated Apr. 29, 2019.
International Search Report for PCT/KR2017/011190 dated Jan. 18, 2018.

*Primary Examiner* — Caixia Lu
(74) *Attorney, Agent, or Firm* — Lerner, David, Littenberg, Krumholz & Mentlik, LLP

(57) ABSTRACT

The present invention relates to a supported metallocene catalyst including a novel single metallocene compound having excellent polymerization activity, and a process for producing a polypropylene having excellent processability and broad molecular weight distribution using the same.

9 Claims, No Drawings

METALLOCENE SUPPORTED CATALYST AND METHOD FOR PREPARING POLYPROPYLENE USING THE SAME

CROSS-REFERENCE TO RELATED APPLICATIONS

The present application is a national phase entry under 35 U.S.C. § 371 of International Application No. PCT/KR2017/011190 filed Oct. 11, 2017, which claims priority from Korean Patent Application No. 10-2016-0155630 filed Nov. 22, 2016 and Korean Patent Application No. 10-2017-0007187 filed Jan. 16, 2017, all of which are incorporated herein by reference.

TECHNICAL FIELD

The present invention relates to a supported metallocene catalyst and a method for preparing polypropylene using the same. More particularly, the present invention relates to a supported catalyst including a novel single metallocene compound, a method for preparing polypropylene having a broad molecular weight distribution using the same, and a polypropylene obtained therefrom.

BACKGROUND OF THE INVENTION

Olefin polymerization catalyst systems can be classified into Ziegler-Natta and metallocene catalyst systems, and these two highly active catalyst systems have been developed in compliance with their characteristics. A Ziegler-Natta catalyst has been widely applied to existing commercial processes since it was developed in the 1950's. However, since the Ziegler-Natta catalyst is a multi-active site catalyst in which a plurality of active sites are mixed, it has a feature that molecular weight distribution of polymers is broad. Also, since comonomer compositional distribution is not uniform, there is a problem that it has a limitation to secure the desired physical properties.

Meanwhile, the metallocene catalyst includes a combination of a main catalyst whose main component is a transition metal compound, and an organometallic compound cocatalyst whose main component is aluminum. Such a catalyst is a single-site catalyst which is a homogeneous complex catalyst, and offers a polymer having a narrow molecular weight distribution and a uniform comonomer compositional distribution, depending on the single site characteristics. The metallocene catalyst has characteristics capable of changing the stereo-regularity, copolymerization properties, molecular weight, degree of crystallinity, and the like of the polymer by changing the ligand structure of the catalyst and the polymerization conditions.

U.S. Pat. No. 5,032,562 discloses a method of preparing a polymerization catalyst by supporting two different transition metal catalysts on one carrier. This catalyst is prepared by supporting a titanium (Ti)-based Ziegler-Natta catalyst for producing a high molecular weight polymer and a zirconium (Zr)-based metallocene catalyst for producing a low molecular weight polymer on one carrier, and results in a bimodal molecular weight distribution. This catalyst is disadvantageous in that the supporting procedure is complicated and morphology of polymers becomes poor due to a cocatalyst.

U.S. Pat. No. 5,525,678 discloses a method of using a catalyst system for olefin polymerization, in which a metallocene compound and a non-metallocene compound are simultaneously supported on a carrier to realize simultaneous polymerization of a high molecular weight polymer and a low molecular weight polymer. This has disadvantages that the metallocene compound and non-metallocene compound must be separately supported and the support must be pretreated with various compounds for supporting reactions.

U.S. Pat. No. 5,914,289 discloses a method of controlling the molecular weight and the molecular weight distribution of polymers using metallocene catalysts which are supported on respective supports. However, a large amount of solvent and a long period of time are required to prepare the supported catalysts, and the metallocene catalysts used have to be supported on the respective supports, which is troublesome.

Korean Patent Application No. 2003-12308 discloses a method of controlling the molecular weight distribution of polymers by performing polymerization while changing a combination of catalysts in a reactor by supporting a dinuclear metallocene catalyst and a mononuclear metallocene catalyst on a support with an activating agent. However, this method is limited in simultaneous realization of properties of the respective catalysts. In addition, there is a disadvantage that a metallocene catalyst portion is liberated from a supported catalyst to cause fouling in the reactor. In particular, general metallocene catalysts for the production of polypropylene have undergone the supporting process in order to be applied to bulk polymerization, but the supporting process is difficult, and when the supporting is not performed well, process problems (e.g., fouling) will occur.

In general, supported metallocene catalysts are characterized by having a very narrow molecular weight distribution. However, since there are also disadvantageous aspects in terms of processability and the like, it may be disadvantageous for products requiring a broad molecular weight distribution. In order to solve these problems, a method of mixing and using a metallocene catalyst capable of providing polypropylene having different molecular weights has been introduced. However, a method capable sufficiently improving the processability of polypropylene by using a metallocene catalyst has not yet been developed. Therefore, there is a need for research to improve the processability by controlling the molecular weight distribution of polypropylene polymerized with a single metallocene catalyst.

DETAILS OF THE INVENTION

Objects of the Invention

It is an object of the present invention to provide a supported metallocene catalyst including a novel metallocene compound capable of producing a polypropylene having excellent mechanical properties, processability, fluidity, crystallinity, and the like as a polymer in the form of powder without fouling and with high catalytic activity.

It is another object of the present invention to provide a method for preparing polypropylene having a broad molecular weight distribution using the above-described supported metallocene catalyst.

Means for Achieving the Object

According to one embodiment of the present invention, a supported metallocene catalyst including a metallocene compound represented by the following Chemical Formula 1, a cocatalyst compound, and a carrier, may be provided.

[Chemical Formula 1]

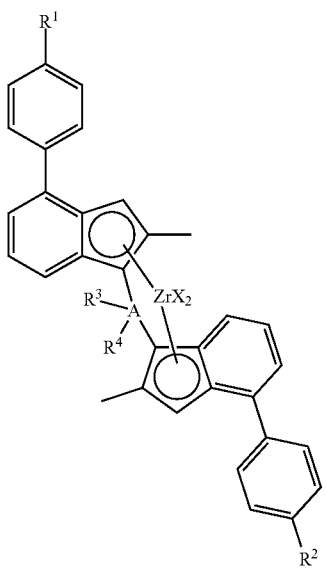

In Chemical Formula 1, $R^1$ and $R^2$ are the same as or different from each other and each independently represents an alkyl group having 1 to 20 carbon atoms substituted with an alkoxy having 1 to 20 carbon atoms;

$R^3$ and $R^4$ are the same as or different from each other and each independently represents an alkyl group having 1 to 20 carbon atoms;

A is carbon, silicon, or germanium; and each X may be the same as or different from each other and each independently represents a halogen or an alkyl group having 1 to 20 carbon atoms.

As an example, $R^1$ and $R^2$ in Chemical Formula 1 may each independently be a t-butoxymethylene group, a methoxymethylene group, an ethoxymethylene group, an i-propoxymethylene group, or a phenoxymethylene group.

The metallocene compound may have one of the following structural formulas.

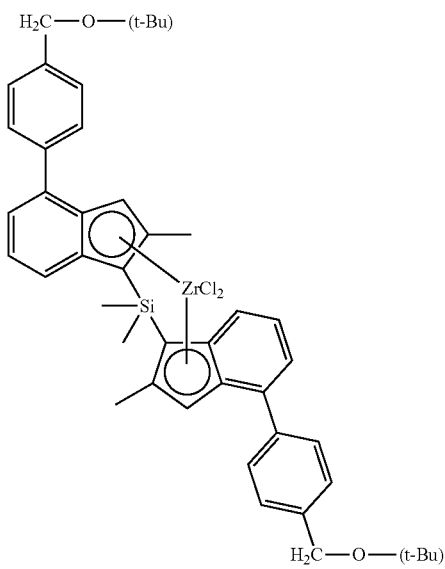

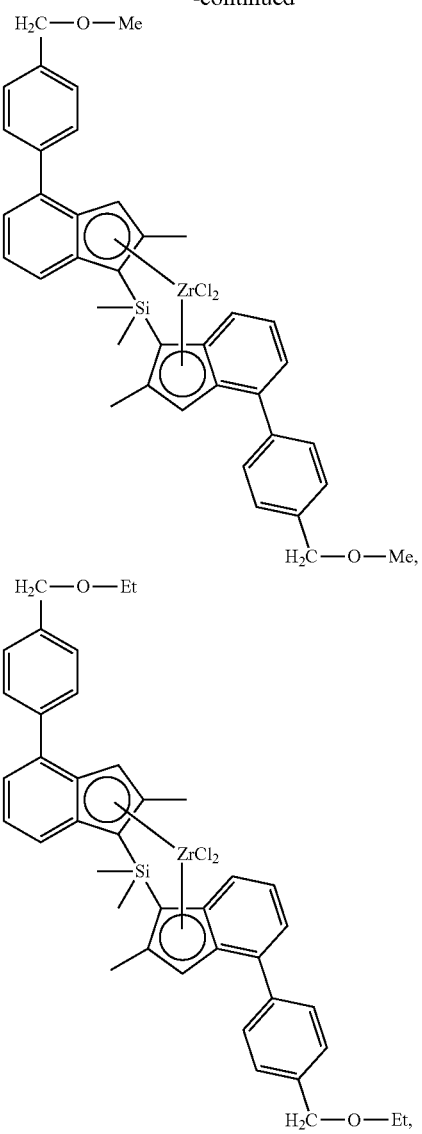

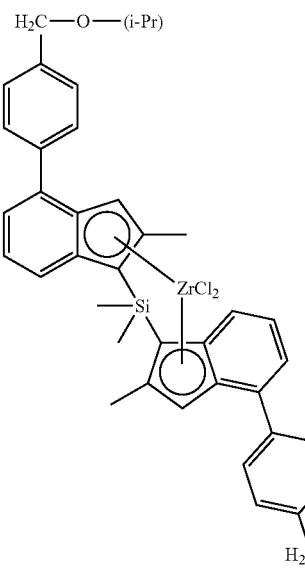

-continued
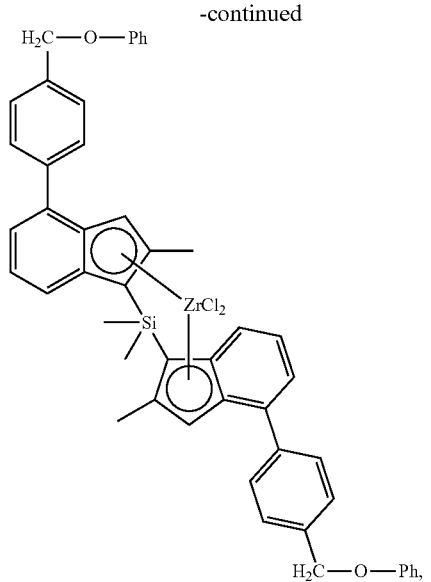
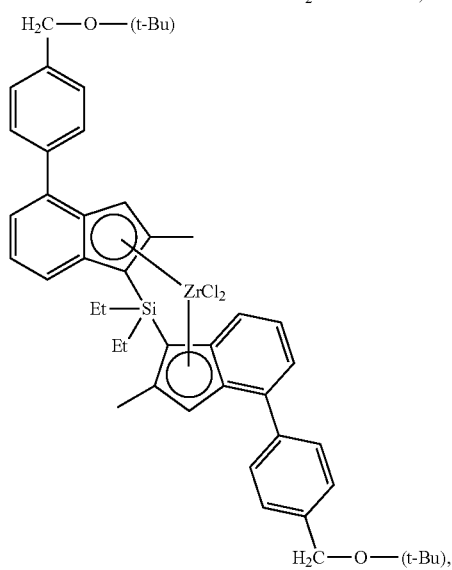
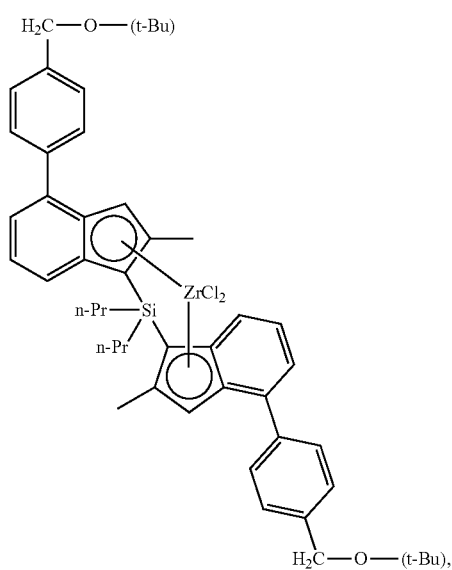
-continued
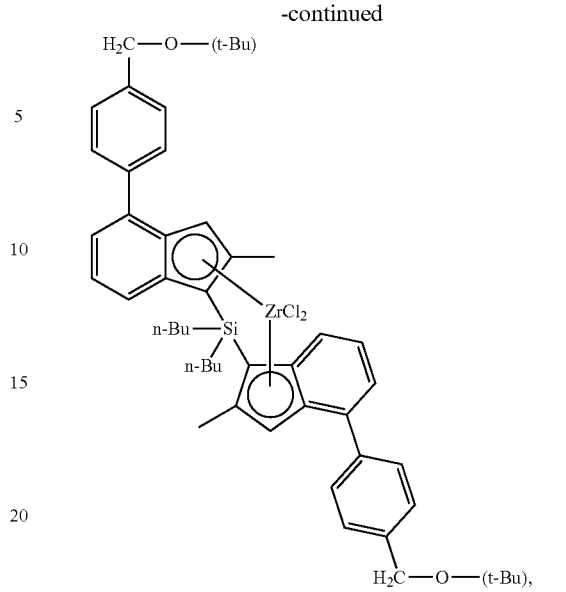
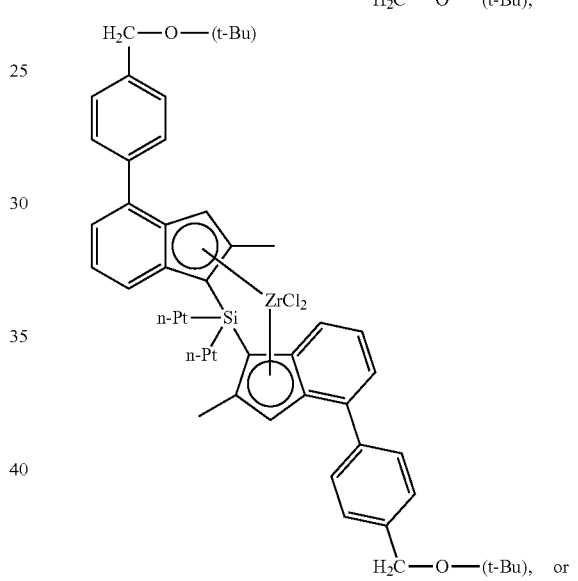
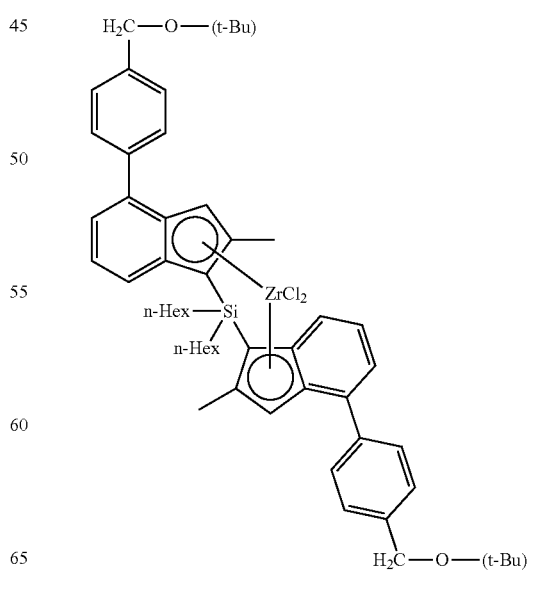

The carrier may include any one selected from the group consisting of silica, alumina, and magnesia, or a mixture thereof.

In addition, one or more kinds of compounds represented by the following Chemical Formula 2, Chemical Formula 3, or Chemical Formula 4 can be further supported as a cocatalyst in the above-mentioned carrier.

$$—[Al(R^5)—O]_n—$$ [Chemical Formula 2]

In Chemical Formula 2,
each $R^5$ may be the same as or different from each other and each independently represents a halogen, a hydrocarbon having 1 to 20 carbon atoms, or a hydrocarbon having 1 to 20 carbon atoms substituted with a halogen; and
n is an integer of 2 or more.

$$J(R^6)_3$$ [Chemical Formula 3]

In Chemical Formula 3,
each $R^6$ may be the same as or different from each other, and each independently represents a halogen, a hydrocarbon having 1 to 20 carbon atoms, or a hydrocarbon having 1 to 20 carbon atoms substituted with a halogen, and J is aluminum or boron.

$$[E-H]^+[ZA'_4]^- \text{ or } [E]^+[ZA'_4]^-$$ [Chemical Formula 4]

In Chemical Formula 4,
E is a neutral or cationic Lewis acid;
H is a hydrogen atom;
Z is a Group 13 element; and
each A' may be the same as or different from each other and each independently represents an aryl group having 6 to 20 carbon atoms or an alkyl group having 1 to 20 carbon atoms, of which one or more hydrogen atoms are substituted with a halogen, a $C_1$ to $C_{20}$ hydrocarbon, an alkoxy, or a phenoxy.

Here, the weight ratio of the transition metal of the metallocene compound to the carrier may be 1:10 to 1:1000.

According to another embodiment of the present invention, a method for preparing a polypropylene including a step of polymerizing propylene in the presence of the above-mentioned supported metallocene catalyst, is provided.

As an example, the polymerization reaction of propylene can be carried at a temperature of 25 to 500° C. and a pressure of 1 to 100 kgf/cm² for 1 to 24 hours, and it can be carried out under hydrogen ($H_2$) gas at 30 to 2000 ppm with respect to the weight of the propylene.

Effects of the Invention

According to the present invention, a supported metallocene catalyst including a novel metallocene compound capable of producing a polypropylene having excellent mechanical properties, processability, fluidity, crystallinity, and the like as a polymer in the form of powder without fouling and with high catalytic activity is provided.

In addition, when such supported metallocene catalyst is used, the polypropylene having wide molecular weight distribution and excellent processability can be very effectively prepared.

DETAILED DESCRIPTION OF THE EMBODIMENTS

In the present specification, the terms "first," "second," etc. may be used to describe various elements, and these terms are only for the purpose of distinguishing one element from another.

In addition, technical terms used in the present specification are only for the purpose of describing exemplary embodiments, and they are not intended to restrict the present invention.

The singular expressions used herein may include plural expressions unless the context explicitly indicates otherwise. It should be understood that the terms such as "including," "comprising," and "having" as used herein are intended to embody specific features, numbers, steps, components, and/or combinations thereof, and do not preclude existence or addition of other specific features, numbers, steps, components, and/or combinations thereof.

The invention can have various modifications and take various forms, and thus specific embodiments are illustrated and described in detail below.

It should be understood, however, that the invention is not intended to be limited to any particular disclosure form, but includes all modifications, equivalents, and alternatives falling within the spirit and scope of the invention.

Hereinafter, the present invention will be described in more detail.

According to an embodiment of the present invention, a supported metallocene catalyst including a metallocene compound represented by the following Chemical Formula 1, a cocatalyst compound, and a carrier, is provided.

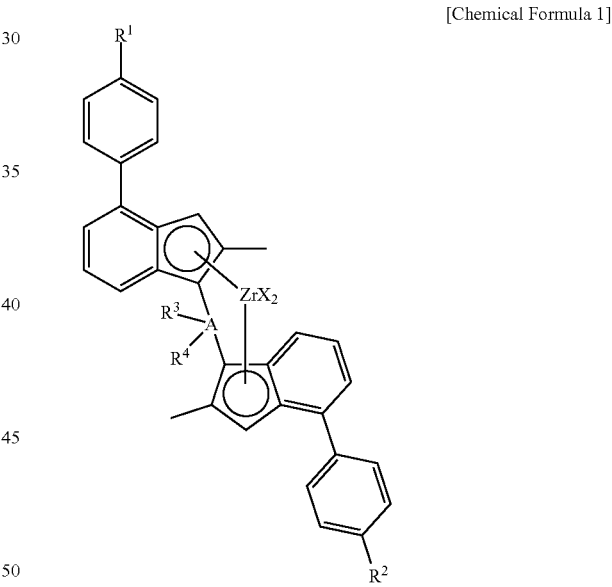

[Chemical Formula 1]

In Chemical Formula 1,
$R^1$ and $R^2$ are the same as or different from each other and each independently represent an alkyl group having 1 to 20 carbon atoms substituted with an alkoxy having 1 to 20 carbon atoms:
$R^3$ and $R^4$ are the same as or different from each other and each independently represent an alkyl group having 1 to 20 carbon atoms:
A is carbon, silicon, or germanium; and
each X may be the same as or different from each other and each independently represents a halogen or an alkyl group having 1 to 20 carbon atoms.

As an example, $R^1$ and $R^2$ in Chemical Formula 1 may each be substituents in which at least one hydrogen in an alkyl group having 1 to 20 carbon atoms is substituted with an alkoxy group having 1 to 20 carbon atoms, that is, they may be an alkoxyalkylene group having 2 to 40 carbon atoms.

In particular, $R^1$ and $R^2$ may be an alkyl group having 1 to 6 carbon atoms substituted with an alkoxy group having 1 to 6 carbon atoms.

Here, since the alkoxy group acts as a functional group capable of chemically reacting with a silica carrier in the preparation of the supported catalyst, all of the substituents $R_1$, $R_2$, and Zr in the metallocene compound have a variety of active sites capable of reacting with the carrier and can exhibit a broad molecular weight distribution Preferably, $R^1$ and $R^2$ may each be a t-butoxymethylene group, a methoxymethylene group, an ethoxymethylene group, an i-propoxymethylene group, or a phenoxymethylene group.

$R^3$ and $R^4$ may each be a methyl group (Me), an ethyl group (Et), an n-propyl group (n-Pr), an n-butyl group (n-Bu), an n-pentyl group (n-Pent), or an n-hexyl group (n-Hex).

each X may be the same or different halogens.

In addition, the compound represented by Chemical Formula 1 may be one of the following structural formulas.

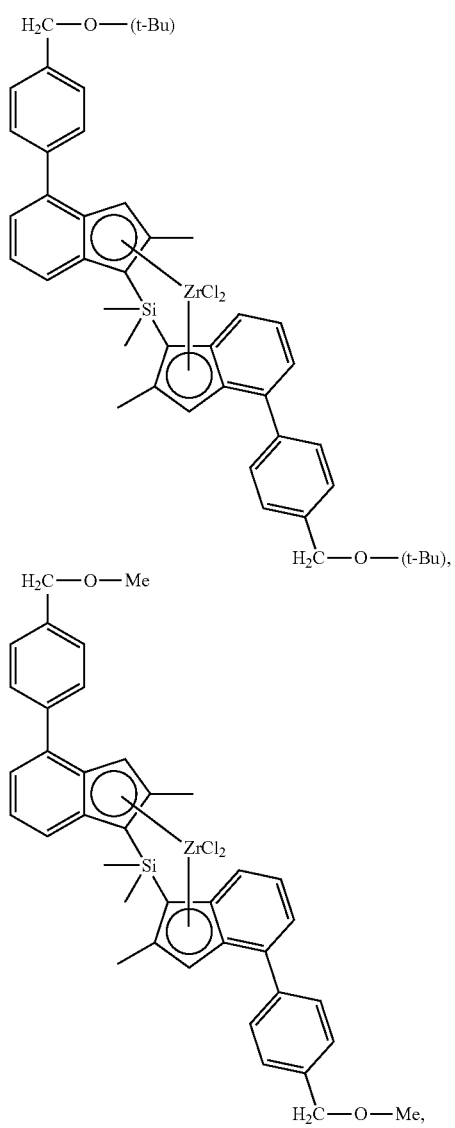

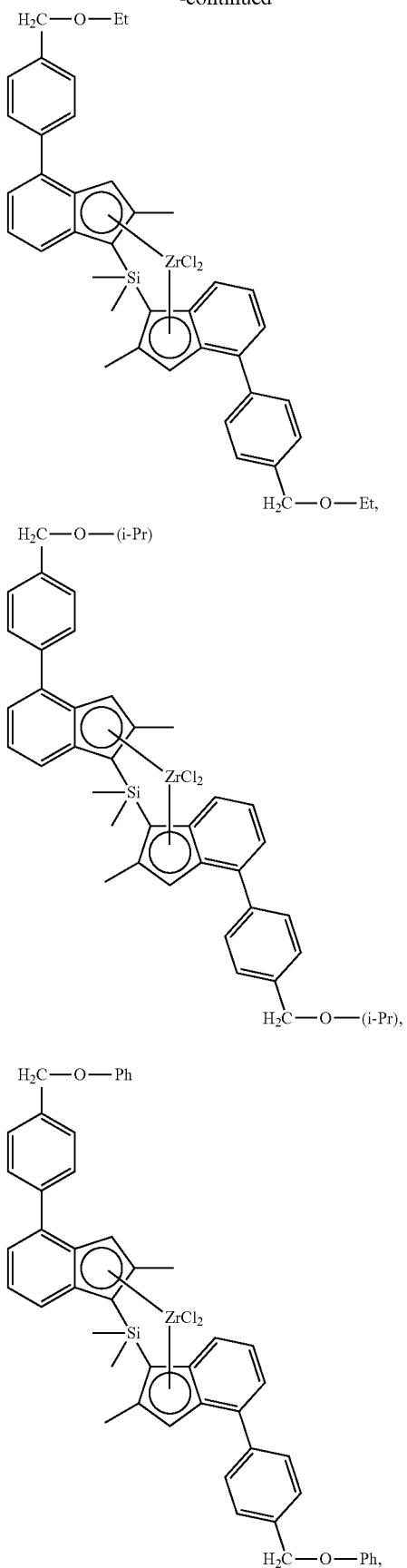

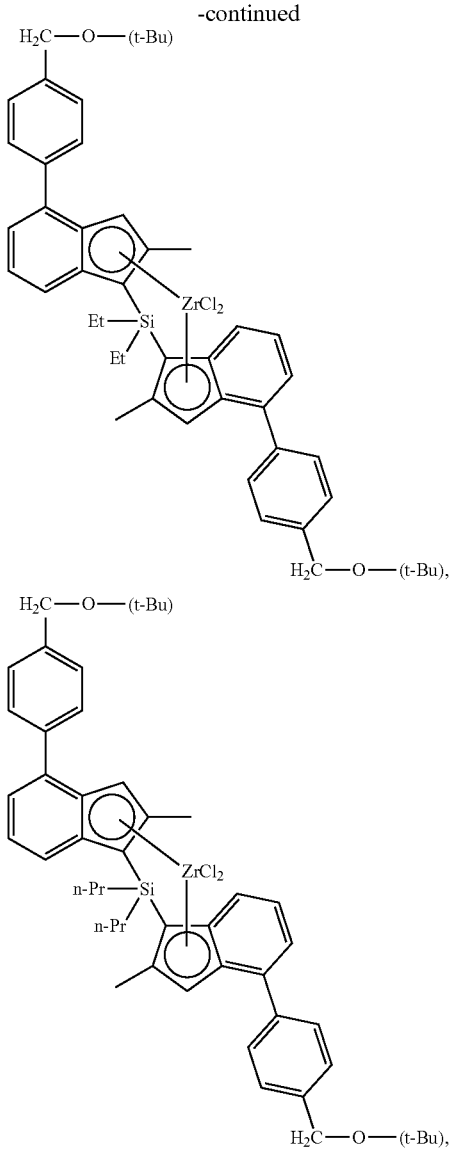

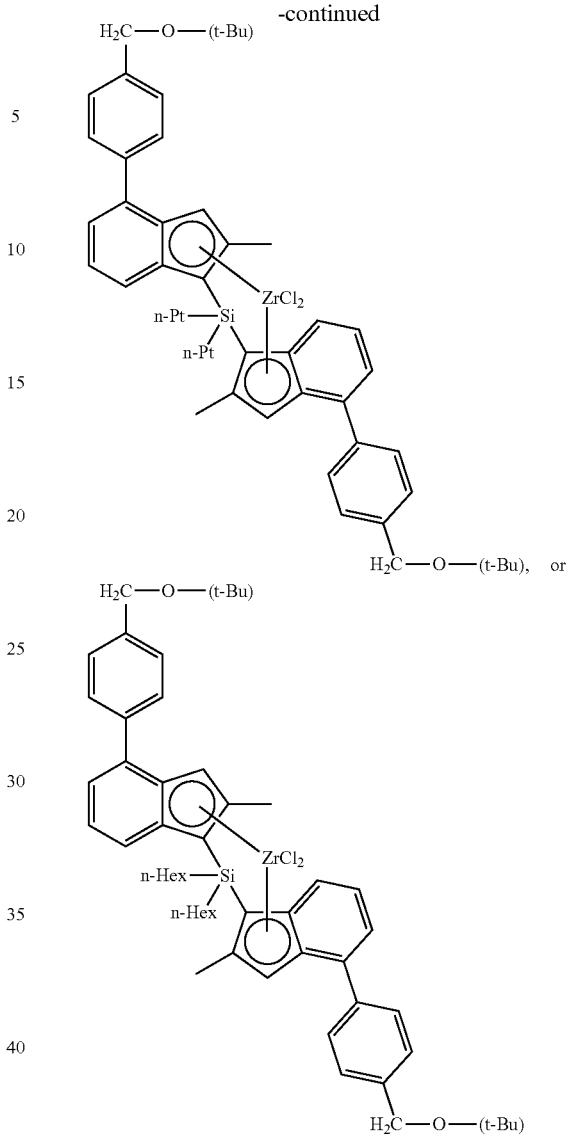

The metallocene compound of Chemical Formula 1 can polymerize a polypropylene having excellent activity and broad molecular weight distribution.

Particularly, the present invention can synthesize a novel catalyst to which a tether is bonded while being capable of inducing an effective supporting reaction, and due to the influence of a tether, a cocatalyst such as MAO and a metallocene compound can be effectively supported on a silica carrier in only two steps. In addition, a polymer in the form of a powder can be obtained without fouling during the polymerization process, and polymers with a broad molecular weight distribution can be prepared by only one catalyst during polypropylene homopolymerization. That is, even if only the metallocene compound represented by Chemical Formula 1 is supported alone without hybrid-supporting a different metallocene compound as the catalyst compound, a broad molecular weight distribution can be realized. According to a preferred embodiment, it is characterized by having a broad molecular weight distribution of about 5, which is difficult to realize with a conventional metallocene catalyst in terms of molecular weight distribution (MWD). Therefore, it is characterized by being capable of preparing a polypropylene having excellent processability, which is difficult to realize with a conventional metallocene catalyst.

According to an embodiment of the present invention, the metallocene compound of Chemical Formula 1 may be obtained by connecting an indene derivative with a bridge compound to prepare a ligand compound, and then carrying out metalation by putting a metal precursor compound therein, but is not limited to thereto.

More specifically, for example, the indene derivative is reacted with an organic lithium compound such as n-BuLi to prepare a lithium salt, which is mixed with a halogenated compound as a bridge compound, and then these mixtures are allowed to react to prepare a ligand compound. The ligand compound or the lithium salt thereof is mixed with the metal precursor compound and reacted therewith for about 12 to 24 hours until the reaction is completed, and then a reaction product is filtered and dried under reduced pressure to obtain the metallocene compound represented by Chemical Formula 1. A method for preparing the metallocene compound of Chemical Formula 1 will be concretely described in examples below.

As the carrier in the supported metallocene catalyst according to one embodiment, a carrier containing a hydroxyl group or a siloxane group on its surface may be used. Specifically, the carrier may be a carrier containing highly reactive hydroxyl group or siloxane group, of which the surface is dried at a high temperature and removed of moisture. More specifically, examples of the carrier include silica, alumina, magnesia, and mixtures thereof. For example, the carrier may be at least one selected from the group consisting of silica, silica-alumina, and silica-magnesia. The carrier may be one which has been dried at a high temperature, and these may typically include oxides, carbonates, sulfates, and nitrate components such as $Na_2O$, $K_2CO_3$, $BaSO_4$, and $Mg(NO_3)_2$.

The amount of the hydroxyl group (—OH) on the surface of the carrier is preferably as small as possible, but it is practically difficult to remove all the hydroxyl groups. The amount of the hydroxyl group can be controlled by the method of preparing the carrier, the preparation conditions, and the drying conditions (temperature, time, drying method, etc.), and is preferably 0.1 to 10 mmol/g, more preferably 0.1 to 1 mmol/g, and still more preferably 0.1 to 0.5 mmol/g. In order to reduce side reactions caused by some hydroxyl groups remaining after drying, it is possible to use a carrier from which this hydroxyl group has been chemically removed while preserving a highly reactive siloxane group participating in the supporting.

In addition, one or more kinds of compounds represented by the following Chemical Formula 2, Chemical Formula 3, or Chemical Formula 4 can be supported as a cocatalyst in the above-mentioned carrier.

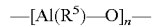   [Chemical Formula 2]

In Chemical Formula 2, each $R^5$ may be the same as or different from each other and each independently represents a halogen, a hydrocarbon having 1 to 20 carbon atoms, or a hydrocarbon having 1 to 20 carbon atoms substituted with a halogen; and n is an integer of 2 or more.

   [Chemical Formula 3]

In Chemical Formula 3, each $R^6$ may be the same as or different from each other and each independently represents a halogen, a hydrocarbon having 1 to 20 carbon atoms, or a hydrocarbon having 1 to 20 carbon atoms substituted with a halogen; and J is aluminum or boron.

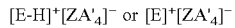   [Chemical Formula 4]

In Chemical Formula 4,

E is a neutral or cationic Lewis acid;

H is a hydrogen atom;

Z is a Group 13 element; and each A' may be the same as or different from each other and each independently represents an aryl group having 6 to 20 carbon atoms or an alkyl group having 1 to 20 carbon atoms, of which one or more hydrogen atoms are substituted with a halogen, a $C_1$ to $C_{20}$ hydrocarbon, an alkoxy, or a phenoxy.

Non-limiting examples of the cocatalyst represented by Chemical Formula 2 may include methyl aluminoxane, ethyl aluminoxane, isobutyl aluminoxane, tert-butyl aluminoxane, etc., and more preferred examples thereof include methyl aluminoxane.

Examples of the compound represented by Chemical Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminummethoxide, trimethylboron, triethylboron, triisobutylboron, tripropylboron, tributylboron, etc., and a more preferred compound is selected from trimethylaluminum, triethylaluminum, and triisobutylaluminum.

Examples of the compound represented by Chemical Formula 4 may include triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, diethylammonium tetrapentatetraphenylaluminum, triphenylphosphonium tetraphenylaluminum, trimethylphosphonium tetraphenylaluminum, tripropylammonium tetra(p-tolyl)boron, triethylammonium tetra(o,p-dimethylphenyl)boron, tributylammonium tetra(p-trifluoromethylphenyl)boron, triphenylcarboniumtetra(p-trifluoromethylphenyl)boron, triphenylcarboniumtetrapentafluorophenylboron, etc.

Preferably, aluminoxane may be used as such cocatalyst, and more preferably, methylaluminoxane (MAO), which is an alkyl aluminoxane, may be used. In addition, the cocatalyst can be used in an appropriate amount so that the activation of the metallocene compound, which is a catalyst precursor, can sufficiently proceed.

The metallocene-supported catalyst according to the present invention may be prepared by a first method including 1) contacting the metallocene compound represented by Chemical Formula 1 with the compound represented by Chemical Formula 2 or Chemical Formula 3 to obtain a mixture; and 2) adding the compound represented by Chemical Formula 4 to the mixture.

Furthermore, the metallocene-supported catalyst according to the present invention may be prepared by a second method of contacting the metallocene compound represented by Chemical Formula 1 with the compound represented by Chemical Formula 2.

In the first method of preparing the supported catalyst, a molar ratio of the metallocene compound represented by Chemical Formula 1/the compound represented by Chemical Formula 2 or Chemical Formula 3 is preferably 1/5000 to 1/2, more preferably 1/1000 to 1/10, and most preferably 1/500 to 1/20. When the molar ratio of the metallocene compound represented by Chemical Formula 1/the compound represented by Chemical Formula 2 or Chemical Formula 3 exceeds 1/2, there is a problem that the amount of the alkylating agent is very small and thus the metal compound is not completely alkylated, and when the molar ratio is less than 1/5000, the alkylation of the metal compound is performed, but there is a problem that the alkylated metal compound is not completely activated due to a side reaction between the remaining excess alkylating agent and an activator of Chemical Formula 5. Furthermore, a molar ratio of the metallocene compound represented by Chemical Formula 1/the compound represented by Chemical Formula 4 is preferably 1/25 to 1, more preferably 1/10 to 1, and most preferably 1/5 to 1. When the molar ratio of the metallocene compound represented by Chemical Formula 1/the compound represented by Chemical Formula 4 exceeds 1, there is a problem that the activity of the prepared supported catalyst is deteriorated because the amount of the activator is relatively small and thus the metal compound is not completely activated, and when the molar ratio is less than 1/25, the activation of the metal compound is completely performed, but there is a problem that cost of the supported catalyst is not economical or purity of the polymer to be prepared is decreased due to the remaining excess activator.

In the second method of preparing the supported catalyst, a molar ratio of the metallocene compound represented by Chemical Formula 1/the compound represented by Chemical Formula 2 is preferably 1/10000 to 1/10, more preferably 1/5000 to 1/100, and most preferably 1/3000 to 1/500. When the molar ratio exceeds 1/10, there is a problem that the activity of the prepared supported catalyst is deteriorated because the amount of the activator is relatively small and thus the metal compound is not completely activated, and when the molar ratio is less than 1/10,000, the activation of the metal compound is completely performed, but there is a problem that cost of the supported catalyst is not economical or purity of the polymer to be prepared is decreased due to the remaining excess activator.

As a reaction solvent used in the preparation of the supported catalyst, a hydrocarbon solvent such as pentane, hexane, heptane, etc., or an aromatic solvent such as benzene, toluene, etc. may be used.

Furthermore, when the metallocene compound and the cocatalyst compound are used in the form of being supported on a carrier, the metallocene compound may be included in an amount of about 0.5 to about 20 parts by weight and the cocatalyst may be included in an amount of about 1 to about 1000 parts by weight, based on 100 parts by weight of the carrier. Preferably, the metallocene compound may be included in an amount of about 1 to about 15 parts by weight and the cocatalyst may be included in an amount of about 10 to about 500 parts by weight, based on 100 parts by weight of the support. Most preferably, the metallocene compound may be included in an amount of about 1 to about 100 parts by weight and the cocatalyst may be included in an amount of about 40 to about 150 parts by weight, based 100 parts by weight of the carrier.

In the metallocene-supported catalyst of the present disclosure, a weight ratio of the total transition metals included in the metallocene compound to the carrier may be 1:10 to 1:1000. When the carrier and the metallocene compound are included at the above weight ratio, an optimal shape may be obtained. Further, a weight ratio of the cocatalyst compound to the carrier may be 1:1 to 1:100. When the cocatalyst and the metallocene compound are included at the above weight ratio, activity and polymer microstructure may be optimized.

The supported metallocene catalyst may further include additives and adjuvants commonly employed in the technical field to which the present invention pertains in addition to the above-mentioned components.

According to another embodiment of the present invention, a method for preparing a polypropylene including a step of polymerizing propylene in the presence of the supported metallocene catalyst is provided.

As described above, the supported metallocene catalyst can provide a polypropylene having high catalytic activity, a broad molecular weight distribution, and improved processability by using a catalyst including a metallocene compound of Chemical Formula 1 which contains an indene ligand having a specific substituent.

In the method for preparing a polypropylene according to one embodiment of the present invention, the supported catalyst including the metallocene compound of Chemical Formula 1 has improved catalytic activity as compared with the conventional Ziegler-Matta catalyst or metallocene catalyst, and even when the supporting conditions of the metallocene compound are changed, that is, even if the reaction temperature, the reaction time, the kind of silica, and the amount of supported metallocene compound are changed, polypropylene can be produced with improved activity.

Here, the polymerization of propylene can be carried out by reacting at a temperature of about 25 to about 500° C. and a pressure of about 1 to about 100 kgf/m$^2$ for about 1 to about 24 hours. At this time, the polymerization reaction temperature is preferably about 25° C. to about 200 CC, and more preferably about 50° C. to about 100° C. In addition, the polymerization reaction pressure is preferably about 1 to about 70 kgf/m$^2$, and more preferably about 5 to about 50 kgf/m$^2$. The polymerization reaction time is preferably about 1 to about 5 hours.

The method for preparing the polypropylene of the present disclosure can be carried out by contacting propylene with a catalyst including the metallocene compound represented by Chemical Formula 1.

Further, according to one embodiment of the present invention, the polymerization of propylene can be carried out under hydrogen gas.

At this time, the hydrogen gas acts to activate the inactive sites of the metallocene catalyst and cause a chain transfer reaction to control the molecular weight. The metallocene compound of the present disclosure is excellent in hydrogen reactivity, and therefore polypropylene having a desired level of molecular weight and melt index can be effectively obtained by controlling the amount of hydrogen gas used in the polymerization process.

The hydrogen gas may be introduced so as to be about 30 to about 2000 ppm, about 50 to about 1500 ppm, or about 50 to about 500 ppm, based on the weight of propylene. By controlling the amount of the hydrogen gas to be used, the molecular weight distribution and the melt index (MI) of the polypropylene to be produced can be controlled within a desired range while exhibiting sufficient catalytic activity. Accordingly, polypropylene having appropriate physical properties according to the purpose of use can be prepared. More specifically, the metallocene catalyst of the present disclosure has very good hydrogen reactivity. Therefore, as the amount of hydrogen gas used is increased, the chain transfer reaction is activated, thereby obtaining a polypropylene having a reduced molecular weight and a high melt index.

The method for preparing polypropylene can be carried out by a solution polymerization process, a slurry process, or a gas phase process using one continuous slurry polymerization reactor, a loop slurry reactor, a gas phase reactor, a solution reactor, and the like.

In the method for preparing polypropylene according to the present invention, the catalyst may be injected after being dissolved or diluted in an aliphatic hydrocarbon solvent having 5 to 12 carbon atoms, for example, pentane, hexane, heptane, nonane, decane, and isomers thereof, an aromatic hydrocarbon solvent such as toluene and benzene, or a hydrocarbon solvent substituted with a chlorine atom such as dichloromethane and chlorobenzene. It is preferable that the solvent is used after a small amount of water, air, or the like acting as a catalyst poison is removed by treating with a small amount of alkyl aluminum.

The method for preparing polypropylene may further include a step that is conventionally employed in the technical field to which the present invention belongs, in addition to the steps described above.

According to still another embodiment of the present invention, a polypropylene obtained by the above-mentioned preparation method is provided.

As described above, according to the present invention, by using the catalyst including the novel metallocene compound, it is possible to obtain a polyolefin having high polymerization activity together with excellent processability and a broad molecular weight distribution as compared with the case of using a conventional metallocene compound. In particular, the present invention is characterized in that an aryl substituent is introduced at a specific position of the ligand in an indane-based ansa-metallocene catalyst and the aryl substituent is substituted with a functional group having a Lewis base property such as an alkoxy having 1 to 20 carbon atoms, thereby preparing polypropylene having a very broad molecular weight distribution when applied to polypropylene polymerization.

The polypropylene has a low processing temperature, is excellent in transparency and fluidity, and thus can be used as a packaging container, a film, a sheet, an injection-molded product, a fiber product, etc., which require these properties.

According to one embodiment of the present invention, when a polymerization process of propylene is carried out using a catalyst including the metallocene compound, the produced polypropylene may have a weight average molecular weight (Mw) of about 30000 to about 9000000 g/mol, about 80000 to about 1000000 g/mol, or about 100000 to about 1000000 g/mol, depending on the amount of hydrogen used in the polymerization process.

Further, the polypropylene thus produced may have a molecular weight distribution (Mw/Mn) of about 10 or less, for example about 1 to 10, preferably about 4 to 6, and more preferably about 4.5 to 5.8. By having the molecular weight distribution as described above, it can produce products having excellent transparency and processability, especially having less taste and odor problems that are peculiar to polypropylene.

Particularly, according to the present invention, even if only the metallocene compound represented by Chemical Formula 1 is supported without hybrid-supporting a catalyst compound with a different metallocene compound, a broad molecular weight distribution can be realized. Therefore, when the hybrid supported catalyst is used as in the existing case, it is possible to prevent the problem that other physical properties such as Xs, fine powder content, and thermal properties fluctuate together in addition to the molecular weight distribution.

Further, the polypropylene has an amount of xylene solubles (Xs) of about 2.0 wt % or less, preferably about 1.5 wt %, and more preferably about 1.0 wt % or less, which exhibits high stereo-regularity (tacticity). The xylene solubles are the content (% by weight) of the polymer soluble in cold xylene determined by dissolution of propylene in xylene and letting the insoluble part crystallize from the cooling solution. The xylene solubles fraction contains polymer chains of low stereo-regularity, and thus the lower the amount of the xylene solubles, the higher the stereo-regularity.

Further, in the polypropylene produced according to the present invention, the content of a fine powder with a particle diameter of 75 μm or less is about 5.0% by weight or less, preferably about 3.0% by weight or less, and more preferably about 2.0% by weight or less, which generates few fine powders. Therefore, occurrence of fouling due to fine powder and instability of the process due to this are prevented, and the problem of scattering of particles during processing of the product can be reduced.

Further, the polypropylene produced according to the present invention exhibits high fluidity. For example, the polypropylene produced according to the present invention has a broad melt index (MI) of about 1 g/10 min, for example about 1 to about 2500 g/10 min, and preferably about 5 to about 1,500 g/10 min, as measured at 230° C. and 2.16 kg, and the melt index can be controlled according to the amount of hydrogen to be used during the polymerization process, and thus polypropylene having an appropriate melt index according to the purpose of use can be prepared.

Hereinafter, preferable examples are presented in order to facilitate better understanding of the present invention. However, the following examples are provided for illustrative purposes only and are not intended to limit the scope of the invention thereto in any way.

EXAMPLES

Preparation Example of Metalocene Supported Catalyst

Example 1

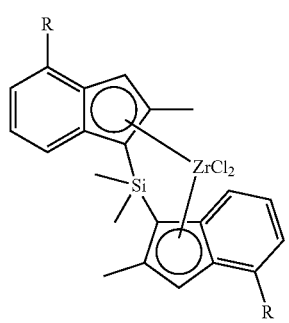

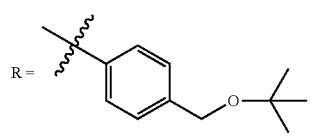

Step 1-1: Synthesis of 1-bromo-4-(tert-butoxymethyl)benzene

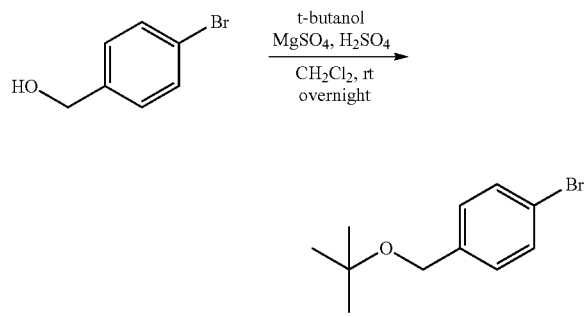

$H_2SO_4$ (1.47 mL) and anhydrous $MgSO_4$ (12.9 g, 107 mmol) were added to $CH_2Cl_2$ (80 mL) and then stirred at room temperature for 15 minutes. In another flask, 4-bromobenzyl alcohol (5.0 g, 26.7 mmol) and t-butanol (12.8 mL, 134 mmol) were dissolved in $CH_2Cl_2$ (30 and then the above mixture was added thereto. The mixture was then stirred at room temperature overnight and then sat. $NaHCO_3$ was added. Water was removed with anhydrous $MgSO_4$, and the resulting solution was concentrated under reduced pressure and then purified by column chromatography (E/H=1/20) to obtain 1-bromo-4-(tert-butoxymethyl)benzene (5.9 g, 90%) as a white solid.

$^1H$ NMR (500 MHz, $CDCl_3$, 7.24 ppm): 1.28 (9H, s), 4.39 (2H, s), 7.22 (2H, d), 7.44 (2H, d)

Step 1-2: Synthesis of 7-(4-tert-butoxymethyl)phenyl)-2-methyl-1H-indene

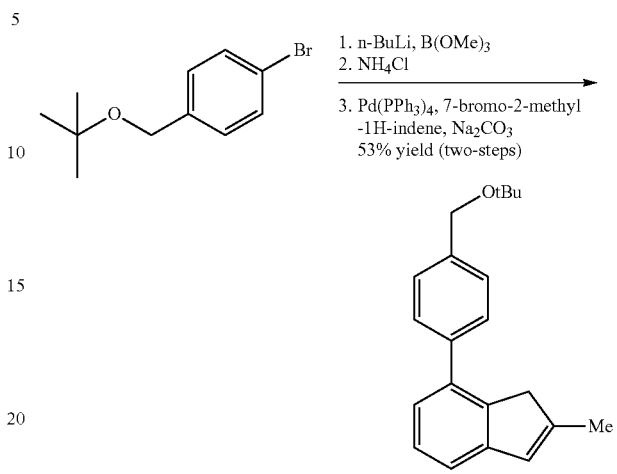

1-bromo-4-(tert-butoxymethyl)benzene (4.52 g, 18.6 mmol) was dissolved in anhydrous THF (20 mL) under argon (Ar). The temperature was lowered to −78° C., and an n-butyllithium solution (n-BuLi, 2.5 M in hexane, 8.2 mL) was added, followed by stirring at room temperature for 30 minutes. The temperature was lowered again to −78° C., trimethyl borate (6.2 mL, 55.6 mmol) was added and then stirred at room temperature overnight. A saturated $NH_4Cl$ solution (sat. $NH_4Cl$) was added to the reaction solution and then extracted with MTBE. Anhydrous $MgSO_4$ was added and water was removed by filtration. The solution was concentrated under reduced pressure and the subsequent reaction was carried out without further purification.

The above obtained compound and 7-bromo-2-methyl-1H-indene (3.87 g, 18.6 mmol) and $Na_2CO_3$ (5.91 g, 55.8 mmol) were added to a mixed solvent of toluene (40 mL), $H_2O$ (20 mL), and EtOH (20 mL) and stirred. $Pd(PPh_3)_4$ (1.07 g, 0.93 mmol) was added to the above solution and then stirred at 90° C. overnight. After the reaction was completed, MTBE and water were added and the organic layer was separated. Water was removed with anhydrous $MgSO_4$. The obtained solution was concentrated under reduced pressure and then purified by column chromatography (E/H=1/30) to obtain 7-(4-tert-butoxymethyl)phenyl)-2-methyl-1H-indene (2.9 g, 53%).

$^1H$ NMR (500 MHz, $CDCl_3$, 7.24 ppm): 1.33 (9H, s), 2.14 (3H, s), 3.36 (2H, s), 4.50 (2H, s), 6.53 (1H, s), 7.11-7.45 (7H, m)

Step 1-3: Synthesis of bis(4-(4-tert-butoxymethyl)phenyl)-2-methyl-1H-inden-1-yl)dimethylsilane

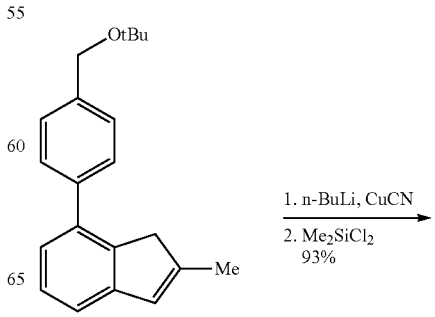

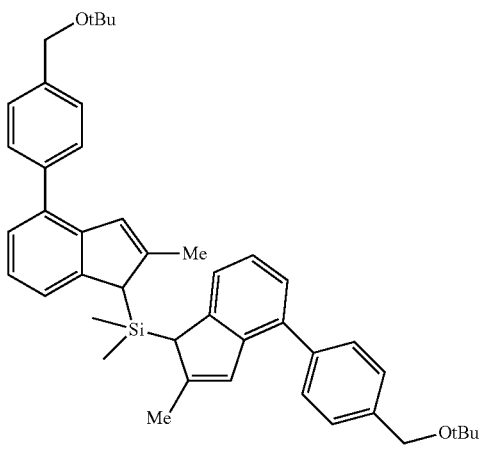

7-(4-tert-butoxymethyl)phenyl)-2-methyl-1H-indene (2.88 g, 9.85 mmol) and CuCN (44 mg, 0.49 mmol) were dissolved in toluene (18 mL) and THF (2 under argon (Ar). This solution was cooled to −30° C. and n-BuLi (2.5 M in hexane, 4.1 mL) was slowly added. After stirring at this temperature for about 20 minutes, the temperature was raised to room temperature and the stirring was carried out for 2.5 hours. Dichlorodimethylsilane (0.59 mL, 4.89 mmol) was added to this solution and then stirred at room temperature overnight. After the reaction was completed, MTBE and water were added and the organic layer was separated. The obtained organic layer was dried over anhydrous MgSO$_4$ to remove water, concentrated under reduced pressure and then purified by column chromatography (hexane) to obtain bis(4-(4-tert-butoxymethyl)phenyl)-2-methyl-1H-inden-1-yl) dimethylsilane (2.95 g, 93%) as a white solid.

$^1$H NMR (500 MHz, CDCl$_3$, 7.24 ppm): −0.20 (6H, s), 1.35 (18H, s), 2.19 (3H, s), 2.25 (3H, s), 3.81 (2H, s), 4.53 (4H, s), 6.81 (2H, s), 7.18-7.52 (14H, m)

Step 1-4: Synthesis of dimetylsilanyl-bis(4-(4-tert-butoxymethyl)phenyl)-2-methyl-1H-inden-1-yl)Zirconium Dichloride

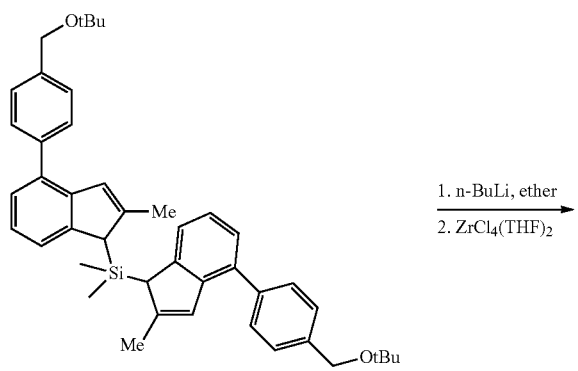

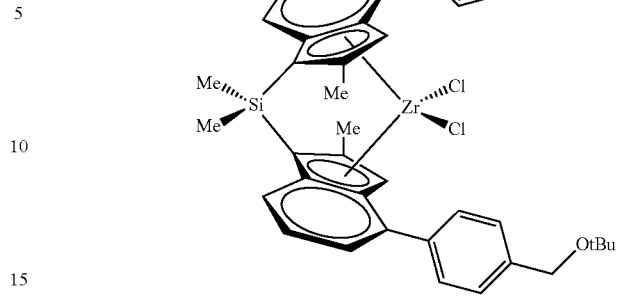

Bis(4-(4-tert-butoxymethyl)phenyl)-2-methyl-1H-inden-1-yl)-dimethyl-silane (2.0 g, 3.12 mmol) was added to a 50 mL Schlenk flask under argon (Ar) and dissolved by injecting diethyl ether (20 mL). The temperature was lowered to −78° C., and n-BuLi (2.5 M in hexane, 2.7 mL) was added and then stirred at room temperature for 2 hours. The solvent was distilled under vacuum/reduced pressure, ZrCl$_4$(THF)$_2$ (1.18 g, 3.12 mmol) mmol) was placed in a glove box, and the temperature was lowered to −78° C. Diethyl ether (20 mL) was added to the mixture and then the temperature was raised to room temperature, followed by stirring overnight. The solvent was distilled under reduced pressure and dissolved in CH$_2$Cl$_2$ to remove the solid. The solution was concentrated under reduced pressure, and the obtained solid was washed with toluene and CH$_2$Cl$_2$ to obtain dimethylsilanyl-bis(4-(4-tert-butoxymethyl)phenyl)-2-methyl-1H-inden-1-yl)zirconium dichloride (260 mg, 10%, r/m about 16/1) as a racemic-rich yellow solid.

$^1$H NMR (500 MHz, CDCl$_3$, 7.24 ppm): 1.28 (18H, s), 1.33 (6H, s), 2.24 (6H, s), 4.46 (4H, s), 6.93 (2H, s), 7.08-7.65 (14H, m)

Step 1-5: Preparation of Supported Catalyst

Methyl aluminoxane was supported on silica in the following manner, and then the supported metallocene compound obtained in step 1-4 was supported to prepare a supported catalyst.

First, silica (3 g) was added to a 250 mL Schlenk flask under argon (Ar), and methylaluminoxane (MAO, 23 mL, 30 mmol) was slowly added at room temperature and stirred at 95° C. for 18 hours. After the reaction was completed, the reaction mixture was cooled to room temperature and allowed to stand for 15 minutes, and then the solvent of an upper layer was removed. Toluene (25 mL) was added, stirred for 1 minute, allowed to stand for 20 minutes, and then the solvent of the upper layer was removed. The metallocene compound (180 µmol) obtained in step 1-4 was dissolved in toluene (20 mL), and the solution was added to the flask using a cannula and washed with toluene (5 mL). After stirring at 75° C. for 5 hours, the mixture was cooled to room temperature and allowed to stand for 15 minutes, and then the solvent of the upper layer was removed. Toluene (25 mL) was added, stirred for 1 minute, allowed to stand for 10 minutes, and then the solvent of the upper layer was removed. These procedures were carried out twice. In the same manner, hexane (25 mL) was added, stirred for 1 minute, allowed to stand for 20 minutes, and then the solvent of the upper layer was removed and dried overnight. Additionally, vacuum drying was carried out at 45° C. for 4 hours.

Example 2

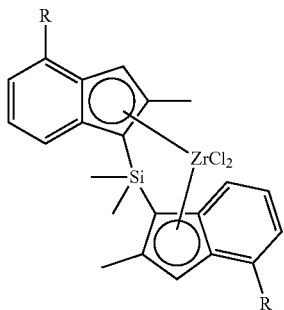

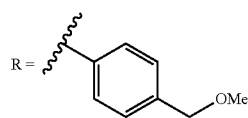

Step 2-1: Synthesis of 1-bromo-4-(methoxymethyl)benzene

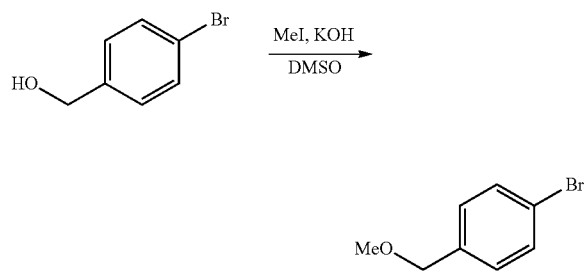

DMSO (117 mL)/KOH (214 mmol, 12 g) was added to a flask, and 4-bromobenzyl alcohol (53.5 mmol, 10.0 g) was added and then stirred at room temperature for 1 hour. MeI (107 mmol, 6.6 mL) was added to the reaction product and then stirred for 10 minutes. After the reaction was completed, the reaction mixture was poured into $H_2O$ and then extracted with $CH_2Cl_2$. The organic layer was dried over anhydrous $MgSO_4$ and then vacuum dried to obtain 1-bromo-4-methoxymethyl benzene (10.6 g, 99%).

$^1$H NMR (500 MHz, CDCl$_3$, 7.24 ppm): 3.41 (3H, s), 4.39 (2H, s), 7.11-7.53 (4H, m)

Step 2-2: Synthesis of 7-(4-methoxymethyl)phenyl)-2-methyl-1H-indene

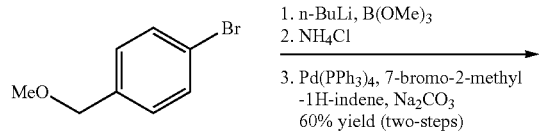

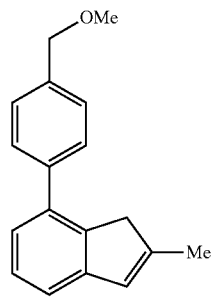

1-bromo-4-(methoxymethyl)benzene (9.3 g, 46.3 mmol) was dissolved in anhydrous THF (40 under argon (Ar). The temperature was lowered to −78° C., and an n-butyllithium solution (n-BuLi, 2.5 M in hexane, 20.4 mL) was added, followed by stirring at room temperature for 30 minutes. The temperature was lowered again to −78° C., and trimethyl borate (15.5 mL, 139 mmol) was added and then stirred at room temperature overnight. Sat. NH$_4$Cl was added to the reaction solution and then extracted with MTBE. Anhydrous MgSO$_4$ was added and water was removed by filtration. The solution was concentrated under reduced pressure and the subsequent reaction was carried out without further purification.

The above obtained compound, 7-bromo-2-methyl-1H-indene (9.63 g, 46.3 mmol), and Na$_2$CO$_3$ (14.7 g, 139 mmol) were added to a mixed solvent of toluene (80 mL), H$_2$O (40 mL), and EtOH (40 mL) and stirred. Pd(PPh$_3$)$_4$ (1.07 g, 2.32 mmol) was added to the above solution and then stirred at 90° C. overnight. After the reaction was completed, MTBE and water were added and the organic layer was separated. Water was removed with anhydrous MgSO$_4$. The obtained solution was concentrated under reduced pressure and then purified by column chromatography (E/H=1/30) to obtain 7-(4-(methoxymethyl)phenyl)-2-methyl-1H-indene (6.9 g, 60%).

$^1$H NMR (500 MHz, CDCl$_3$, 7.24 ppm): 2.15 (3H, s), 3.35 (2H, s), 3.38 (3H, s), 4.48 (2H, s), 6.55 (1H, s), 7.05-7.44 (7H, m)

Step 2-3: Synthesis of bis(4-(4-methoxymethyl)phenyl)-2-methyl-1H-inden-1-yl)dimethylsilane

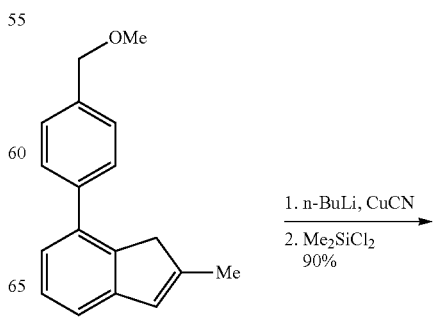

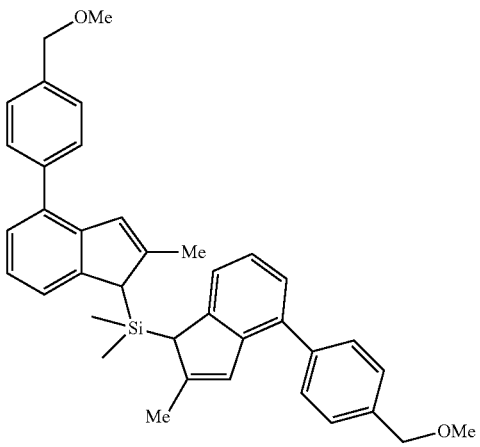

7-(4-methoxymethyl)phenyl)-2-methyl-1H-indene (4.21 g, 16.8 mmol) and CuCN (75 mg, 0.84 mmol) were dissolved in toluene (36 mL) and THF (4 ml) under argon (Ar). This solution was cooled to −30° C. and n-BuLi (2.5 M in hexane, 7.4 mL) was slowly added. After stirring at this temperature for about 20 minutes, the temperature was raised to room temperature and then stirring was carried out for 2.5 hours. Dichlorodimethylsilane (1.01 mL, 8.4 mmol) was added to this solution and then stirred at room temperature overnight. After the reaction was completed, MTBE and water were added and the organic layer was separated. The obtained organic layer was dried over anhydrous $MgSO_4$ to remove water, concentrated under reduced pressure, and then purified by column chromatography (hexane) to obtain bis(4-(4-methoxymethyl)phenyl)-2-methyl-1H-inden-1-yl)dimethylsilane (4.21 g, 90%) as a white solid.

$^1$H NMR (500 MHz, $CDCl_3$, 7.24 ppm): −0.21 (6H, s), 2.20 (3H, s), 2.23 (3H, s), 3.40 (6H, s), 3.82 (2H, s), 4.50 (4H, s), 6.79 (2H, s), 7.15-7.53 (14H, m)

Step 2-4: Synthesis of dimethylsilanyl-bis(4-(4-methoxymethyl)phenyl)-2-methyl-1H-inden-1-yl) zirconium Dichloride

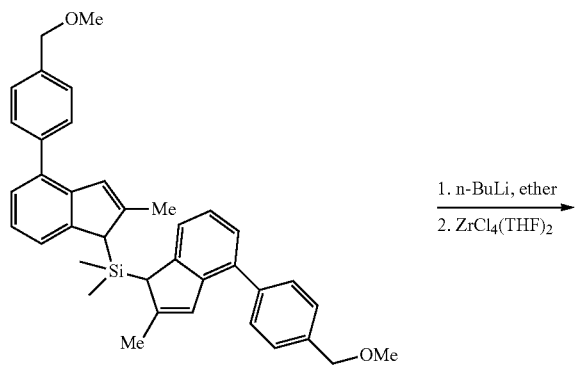

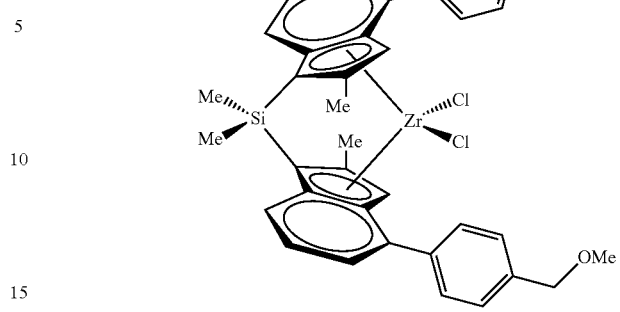

Bis(4-(4-methoxymethyl)phenyl)-2-methyl-1H-inden-1-yl)-dimethyl-silane (3.0 g, 5.39 mmol) was added to a 50 mL Schlenk flask under argon (Ar) and dissolved by injecting diethyl ether (30 mL). The temperature was lowered to −78° C., n-BuLi (2.5 M in hexane, 47 mL) was added, and then stirred at room temperature for 2 hours. The solvent was distilled under reduced pressure, $ZrCl_4(THF)_2$ (2.04 g, 5.39 mmol) was placed in a glove box, and the temperature was lowered to −78° C. Diethyl ether (30 mL) was added to the mixture, the temperature was raised to room temperature, and stirring was carried out overnight. The solvent was distilled under reduced pressure and dissolved in $CH_2Cl_2$ to remove the solid. The solution was concentrated under reduced pressure and the obtained solid was washed with toluene and $CH_2Cl_2$ to obtain dimethylsilanyl-bis(4-(4-methoxymethyl)phenyl)-2-methyl-1H-inden-1-yl)zirconium dichloride (425 mg, 11%, r/m about 10/1) as a racemic-rich yellow solid.

$^1$H NMR (500 MHz, $CDCl_3$, 7.24 ppm): 1.31 (6H, s), 2.22 (6H, s), 3.39 (6H, s), 4.43 (4H, s), 6.91 (2H, s), 7.09-7.64 (14H, m)

Step 2-5: Preparation of Supported Catalyst

Methyl aluminoxane was supported on silica in the following manner, and then the metallocene compound obtained in step 2-4 was supported to prepare a supported catalyst.

First, silica (3 g) was added to a 250 mL Schlenk flask under argon (Ar), and methylaluminoxane (MAO, 23 mL, 30 mmol) was slowly added at room temperature and stirred at 95° C. for 18 hours. After the reaction was completed, the reaction mixture was cooled to room temperature and allowed to stand for 15 minutes, and then the solvent of an upper layer was removed. Toluene (25 mL) was added, stirred for 1 minute, allowed to stand for 20 minutes, and then the solvent of the upper layer was removed. The metallocene compound (180 μmol) obtained in step 2-4 was dissolved in toluene (20 mL), and the solution was added to the flask using a cannula and washed with toluene (5 mL). After stirring at 75° C. for 5 hours, the mixture was cooled to room temperature and allowed to stand for 15 minutes, and then the solvent of the upper layer was removed. Toluene (25 mL) was added, stirred for 1 minute, allowed to stand for 10 minutes, and then the solvent of the upper layer was removed. These procedures were carried out twice. In the same manner, hexane (25 mL) was added, stirred for 1 minute, allowed to stand for 20 minutes, and then the solvent of the upper layer was removed and dried overnight. Additionally, vacuum drying was carried out at 45° C. for 4 hours.

Comparative Example 1

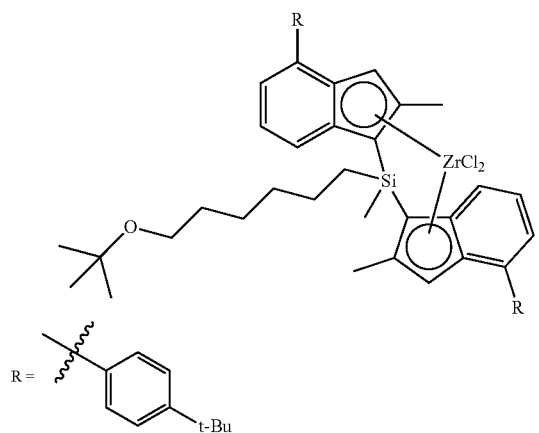

Step 3-1: Preparation of (6-t-butoxyhexyl) Dichloromethylsilane

To 100 mL of a trichloromethylsilane solution (about 0.21 mol, hexane), 100 mL of t-butoxyhexylmagnesium chloride solution (about 0.14 mol, diethyl ether) was slowly added dropwise at −100° C. through 3 hours, and then stirred at room temperature for 3 hours.

After the transparent organic layer was separated from the mixed solution, the separated transparent organic layer was vacuum-dried to remove excess trichloromethylsilane. Thereby, a transparent liquid (6-t-butoxyhexyl)dichloromethylsilane was obtained (yield 84%).

$^1$H NMR (500 MHz, CDCl$_3$, 7.24 ppm): 0.76 (3H, s), 1.11 (2H, t), 1.18 (9H, s), 1.32-1.55 (8H, m), 3.33 (2H, t)

Step 3-2: Preparation of (6-t-butoxyhexyl) (methyl)-bis(2-methyl-4-(4-t-butyl)phenylindenyl) silane 2-methyl-4-tert-butylphenyl indene (20.0 g, 76 mmol) was dissolved in a toluene/THF-10/1 solution (230 mL) and then n-butyllithium solution (2.5 M, hexane solvent, 22 g) was slowly added dropwise at 0° C., and then stirred at room temperature for one day. Then, (6-t-butoxyhexyl)dichloromethylsilane (1.27 g) was slowly added dropwise to the mixed solution at −78° C. and stirred for about 10 minutes, followed by stirring at room temperature for one day. Water was then added to separate the organic layer, and the solvent was distillated under reduced pressure to obtain (6-t-butoxyhexyl) (methyl)-bis(2-methyl-4-(4-t-butyl)phenylindenyl) silane.

$^1$H NMR (500 MHz, CDCl$_3$, 7.26 ppm): −0.20-0.03 (3H, s), 0.50-1.20 (4H, m), 1.20-1.31 (11H, m), 1.26 (9H, s), 1.40-1.62 (20H, m), 2.19-2.23 (6H, m), 3.30-3.34 (2H, m), 3.73-3.83 (2H, m), 6.89-6.91 (2H, m), 7.19-7.61 (14H, m)

Step 3-3: Preparation of [(6-t-butoxyhexylmethylsilane-diyl)-bis(2-methyl-(4-t-butyl) phenylindenyl)] zirconium Dichloride The previously prepared (6-t-butoxyhexyl)(methyl)-bis (2-methyl-4-(4-t-butyl)phenylindenyl)silane was dissolved in a toluene/THF=5!1 solution (95 mL), and then an n-butyllithium solution (2.5 M, hexane solvent, 22 g) was slowly added dropwise at −78° C., and then stirred at room temperature for one day. Bis(N,N'-diphenyl-1,3-propanediamido)dichloro zirconium bis(tetrahydrofuran) [Zr (C$_5$H$_6$NCH$_2$CH$_2$NC$_5$H$_6$)Cl$_2$(C$_4$H$_8$O)$_2$] was dissolved in toluene (229 mL), and then the solution was slowly added dropwise at −78° C., and then stirred at room temperature for one day. After the reaction solution was cooled to −78° C., a HCl ether solution (1 M, 183 mL) was slowly added dropwise, and then stirred at 0° C. for 1 hour. Subsequently, filtration and vacuum drying were carried out, and then hexane was added and stirred to precipitate crystals. The precipitated crystals were filtered and dried under reduced pressure to obtain [(6-t-butoxyhexylmethylsilane-diyl)-bis (2-methyl-(4-t-butyl) phenylindenyl)]zirconium dichloride (20.5 g, total 61%).

$^1$H NMR (500 MHz, C$_6$D$_6$, 7.26 ppm): 1.20 (9H, s), 1.27 (3H, s), 1.34 (18H, s), 1.20-1.90 (10H, m), 2.25 (3H, s), 3.38 (2H, t), 7.00 (2H, s), 7.09-7.13 (2H, m), 7.38 (2H, d), 7.45 (4H, t), 7.58 (4H, d), 7.59 (2H, d), 7.65 (2H, d)

Step 3-4: Preparation of Supported Catalyst

Methyl aluminoxane was supported on silica in the following manner, and then the metallocene compound obtained in step 3-3 was supported to prepare a supported catalyst.

First, silica (3 g) was added to a 250 mL Schlenk flask under argon (Ar), and methylaluminoxane (MAO, 23 mL, 30 mmol) was slowly added at room temperature and stirred at 95° C. for 18 hours. After the reaction was completed, the reaction mixture was cooled to room temperature and allowed to stand for 15 minutes, and then the solvent of an upper layer as removed. Toluene (25 mL) was added, stirred for 1 minute, allowed to stand for 20 minutes, and then the solvent of the upper layer was removed. The metallocene compound (180 μmol) obtained in step 3-3 was dissolved in toluene (20 mL), and the solution was added to the flask using a cannula and washed with toluene (5 mL). After stirring at 75° C. for 5 hours, the mixture was cooled to room temperature and allowed to stand for 15 minutes, and then the solvent of the upper layer was removed. Toluene (25 mL) was added, stirred for 1 minute, allowed to stand for 10 minutes, and then the solvent of the upper layer was removed. These procedures were carried out twice. In the same manner, hexane (25 mL) was added, stirred for 1 minute, allowed to stand for 20 minutes, and then the solvent of the upper layer was removed and dried overnight. Additionally, vacuum drying was carried out at 45° C. for 4 hours.

Comparative Example 2

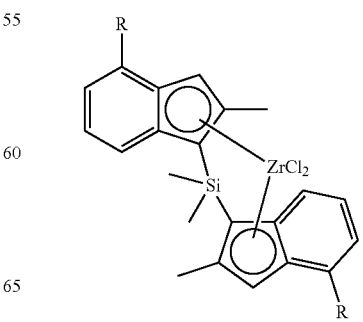

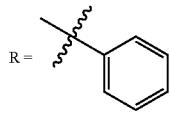

Step 4-1: Preparation of dimethyl bis(2-ethyl-4-phenylindenyl)silane

To 77 mL of a 2-methyl-4-phenylindene toluene/THF=10/1 solution (49.5 mmol), 21.8 mL of an n-butyllithium solution (2.5 M, hexane solvent) was slowly added dropwise at 0° C. The mixture was stirred at 80° C. for 1 hour and then stirred at room temperature for one day. Then, 2.98 mL of dichlorodimethylsilane was slowly added dropwise at 0° C. or lower, stirred for about 10 minutes, then heated to 80° C. and stirred for 1 hour. Then, the organic layer was separated by adding water, and purified by a silica column and vacuum-dried to obtain a sticky yellow oil in a yield of 61% (racemic:meso=1:1).

$^1$H NMR (500 MHz, CDCl$_3$, 7.24 ppm): 0.02 (6H, s), 2.37 (6H, s), 4.00 (2H, s), 6.87 (2H, t), 7.38 (2H, t), 7.45 (2H, t), 7.57 (4H, d), 7.65 (4H, t), 7.75 (4H, d)

Step 4-2: Preparation of [dimethylsilanediylbis(2-methyl-4-phenylindenyl)]zirconium Dichloride To 240 mL of a dimethyl bis(2-ethyl-4-phenylindenyl) silane ether/hexane=1/1 solution (12.4 mmol), 10.9 mL of an n-butyllithium solution (2.5 M, hexane solvent) was slowly added dropwise at −78° C. Then, the mixture was stirred at room temperature for one day, filtered, and then vacuum dried to obtain a pale yellow solid. The ligand salt synthesized in a glove box and bis(N,N'-diphenyl-1,3-propanediamido)dichloro zirconium bis(tetrahydrofuran) were weighed and added to a Schlenk flask to which ether was then slowly added dropwise at −78° C., and then stirred at room temperature for one day. The red solution was filtered off, then vacuum dried, and a toluene/ether=1/2 solution was added to obtain a clean red color solution. 1.5 to 2 equivalents of an ether solution (1 M) of HCl was slowly added dropwise at −78° C., followed by stirring at room temperature for 3 hours. Subsequently, filtration and vacuum drying were carried out to obtain a catalyst of an orange solid component with a yield of 70% (racemic only).

$^1$H NMR (500 MHz, C$_6$D$_6$, 7.24 ppm): 1.32 (6H, s), 2.24 (6H, s), 6.93 (2H, s), 7.10 (2H, t), 7.32 (2H, t), 7.36 (2H, d), 7.43 (4H, t), 7.60 (4H, d), 7.64 (2H, d)

Step 4-3: Preparation of Supported Catalyst

Methyl aluminoxane was supported on silica in the following manner, and then the metallocene compound obtained in step 4-2 was supported to prepare a supported catalyst.

First, silica (3 g) was added to a 250 mL Schlenk flask under argon (Ar), and methylaluminoxane (MAO, 23 mL, 30 mmol) was slowly added at room temperature and stirred at 95° C. for 18 hours. After the reaction was completed, the reaction mixture was cooled to room temperature and allowed to stand for 15 minutes, and then the solvent of an upper layer was removed. Toluene (25 mL) was added, stirred for 1 minute, and allowed to stand for 20 minutes, and then the solvent of the upper layer was removed. The metallocene compound (180 μmol) obtained in step 4-2 was dissolved in toluene (20 mL), and the solution was added to the flask using a cannula and washed with toluene (5 mL). After stirring at 75° C. for 5 hours, the mixture was cooled to room temperature and allowed to stand for 15 minutes, and then the solvent of the upper layer was removed. Toluene (25 mL) was added, stirred for 1 minute, allowed to stand for 10 minutes, and then the solvent of the upper layer was removed. These procedures were carried out twice. In the same manner, hexane (25 mL) was added, stirred for 1 minute, allowed to stand for 20 minutes, and then the solvent of the upper layer was removed and dried overnight. Additionally, vacuum drying was carried out at 45° C. for 4 hours.

Experimental Example

1) Homopolymerization of Propylene

A 2 L stainless steel reactor was vacuum-dried at 65° C. and cooled, 3.0 mmol of triethylaluminum was added thereto at room temperature, 2 bar of hydrogen was applied, and 770 g of propylene was added, sequentially.

After stirring for 10 minutes, 0.060 g of the respective supported metallocene catalysts prepared in Examples 1 and 2 and Comparative Examples 1 and 2 were dissolved in 20 mL of TMA-treated hexane and added to a reactor under nitrogen pressure. Then, the temperature of the reactor was gradually increased up to 70° C., and polymerization was carried out for 1 hour under the conditions of a injected hydrogen quantity of 50 ppm and a pressure of 35 kg/cm$^2$. After the reaction was completed, unreacted propylene was vented.

2) Method of Measuring Physical Properties of Polymer (1) Catalytic activity: Calculated as the ratio of the weight of the produced polymer (kg PP) per amount of the catalyst used (mmol and g of catalyst) based on unit time (h).

(2) Melt Flow Index (MFR, 2.16 kg): Measured according to ASTM D1238 at 230° C. with a load of 2.16 kg and expressed as the weight (g) of the polymer extruded for 10 minutes.

(3) Melting point (Tm) of the polymer: The melting point of the polymer was measured using a differential scanning calorimeter (DSC, device name: DSC 2920, manufacturer: TA Instruments). Specifically, the polymer was heated up to 220° C. and maintained at that temperature for 5 minutes. The temperature was cooled to 20° C. and then again allowed to increase. At this time, the rate of rise and the rate of decrease in temperature were adjusted to 10° C./min, respectively.

(4) Molecular Weight Distribution (MWD) of polymer: The weight average molecular weight (Mw) and the number average molecular weight (Mn) of the polymer were measured by a method using nGPC, and the molecular weight distribution MWD was obtained by dividing the weight average molecular weight into the number average molecular weight.

3) Measurement Results of Physical Properties of Polymer

The conditions of the homopolymerization process using the respective supported metallocene catalysts prepared in Examples 1 and 2 and Comparative Examples 1 and 2 and the measurement results of the physical properties of the produced polypropylene are shown in Table 1 below.

TABLE 1

| | Example 1 | Example 2 | Comparative Example 1 | Comparative Example 2 |
|---|---|---|---|---|
| Metallocene compound | (structure with R = p-C6H4-CH2-O-t-Bu) | (structure with R = p-C6H4-CH2-OMe) | (structure with R = p-C6H4-t-Bu) | (structure with R = phenyl) |
| Amount of supports catalyst (mg) | 40 | 40 | 60 | 240 |
| Hydrogen (ppm) | 372 | 372 | 372 | 372 |
| Yield (g) | 103 | 101 | 428 | 78 |
| Activity (kg/gCat · h) | 2.5 | 2.5 | 7.1 | 0.32 |
| MFR | 57 | 60 | 9.8 | — |
| Tm (° C.) | 145.6 | 145.1 | 148.7 | 150.1 |
| MWD | 5.2 | 5.0 | 2.9 | 2.3 |

Conditions: C3 (770 g), support (L203F), Temperature (70° C.), polymerization time (1 h)

As shown in Table 1, it is confirmed that, according to the present invention, polypropylene having a broad molecular weight distribution can be produced by using a single metallocene catalyst during polypropylene homopolymerization. Particularly, polypropylene having such a broad molecular weight distribution is expected to have excellent effects on processability.

The invention claimed is:

1. A supported metallocene catalyst comprising a metallocene compound represented by the following Chemical Formula 1, a cocatalyst compound, and a carrier:

[Chemical Formula 1]

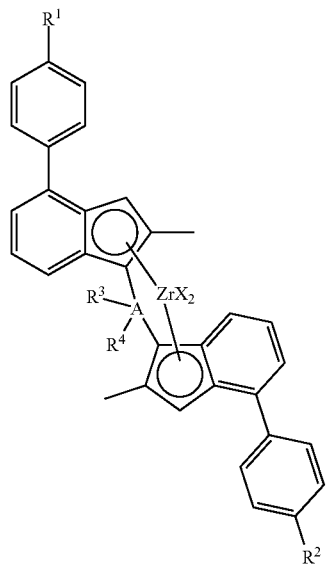

wherein, in Chemical Formula 1,
R$^1$ and R$^2$ are the same as or different from each other and each independently represent an alkyl group having 1 to 20 carbon atoms substituted with an alkoxy having 1 to 20 carbon atoms;

R$^3$ and R$^4$ are the same as or different from each other and each independently represent an alkyl group having 1 to 20 carbon atoms;

A is carbon, silicon, or germanium; and each X is the same as or different from each other and each independently represents a halogen or an alkyl group having 1 to 20 carbon atoms.

2. The supported metallocene catalyst of claim 1, wherein R$^1$ and R$^2$ in Chemical Formula 1 are each independently a i-butoxymethyl group, a methoxymethyl group, an ethoxymethyl group, an i-propoxymethyl group, or a phenoxymethyl group.

3. The supported metallocene catalyst of claim 1, wherein the compound represented by Chemical Formula 1 is one of the following structural formulas:

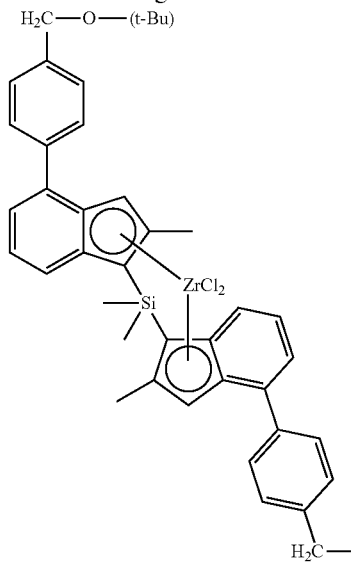

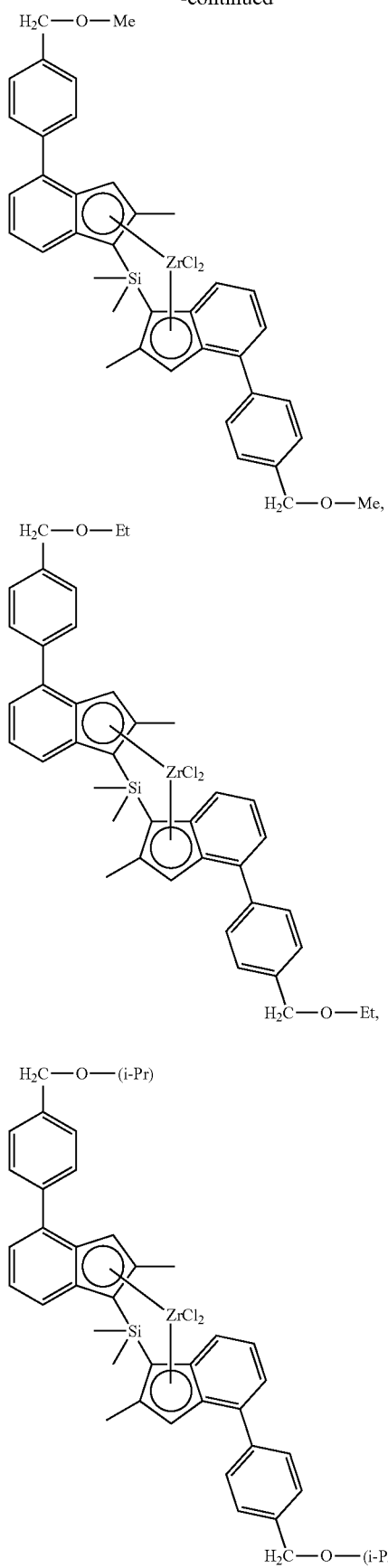
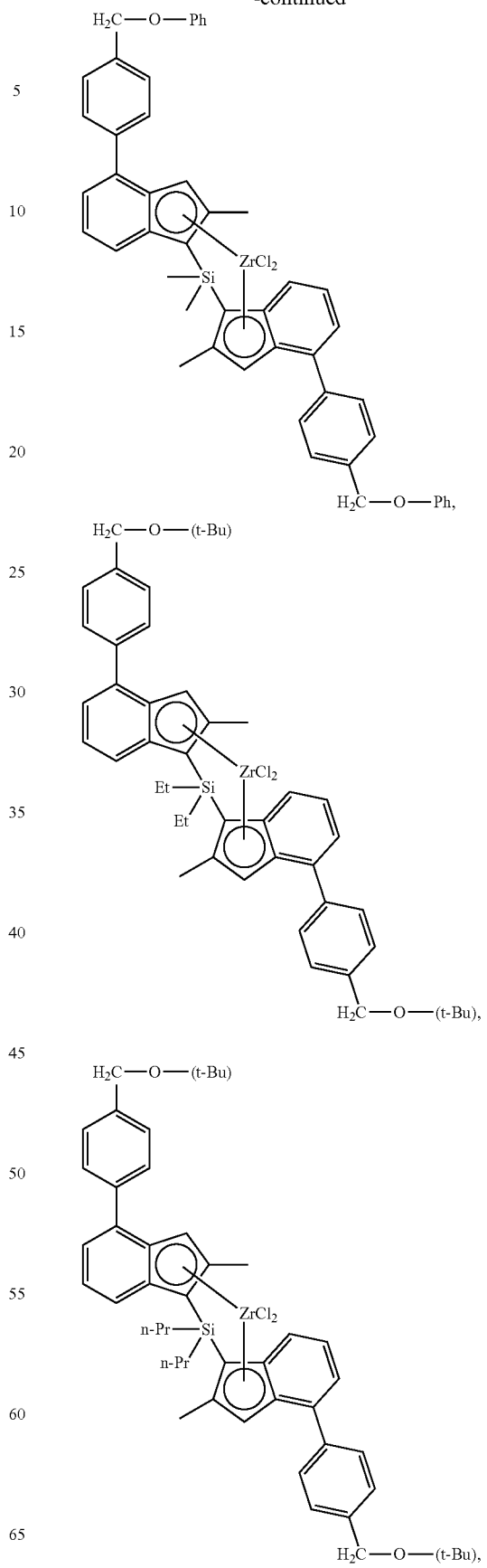

-continued

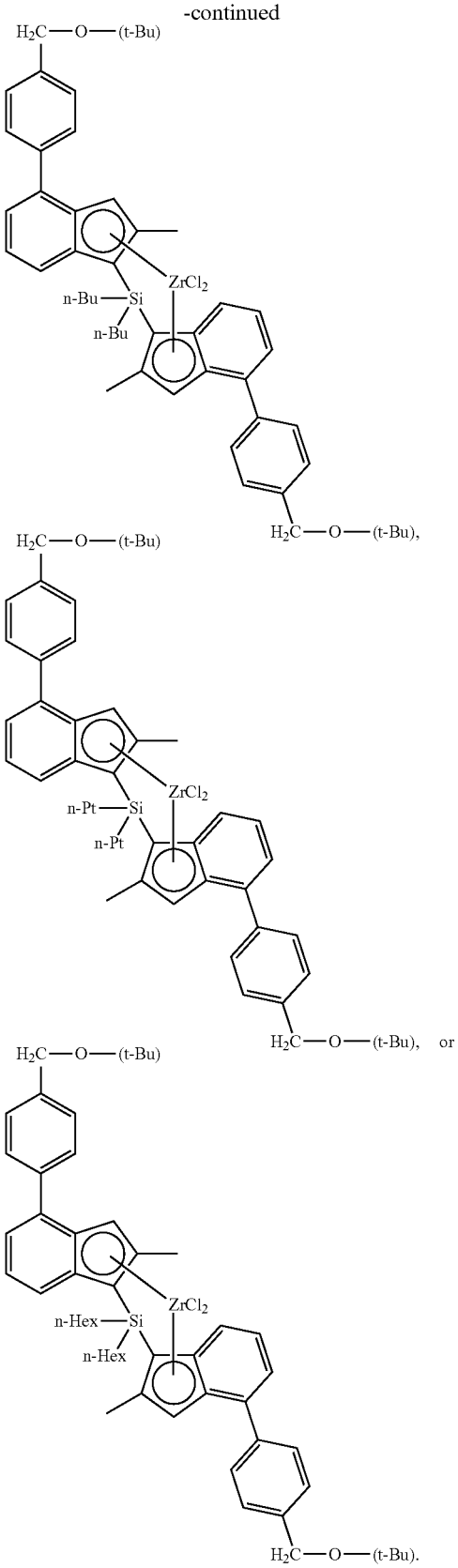

4. The supported metallocene catalyst of claim 1, wherein the cocatalyst compound includes one or more compounds represented by the following Chemical Formula 2, Chemical Formula 3, or Chemical Formula 4:

$$-[Al(R^5)-O]_n-$$ [Chemical Formula 2]

wherein, in Chemical Formula 2, each $R^5$ is the same as or different from each other and each independently represents a halogen, a hydrocarbon having 1 to 20 carbon atoms, or a hydrocarbon having 1 to 20 carbon atoms substituted with a halogen; and n is an integer of 2 or more, $$J(R^6)_3$$ [Chemical Formula 3]

wherein, in Chemical Formula 3, each $R^6$ is the same as or different from each other and each independently represents a halogen, a hydrocarbon having 1 to 20 carbon atoms, or a hydrocarbon having 1 to 20 carbon atoms substituted with a halogen; and J is aluminum or boron, $$[E-H]^+[ZA'_4]^- \text{ or } [E]^+[ZA'_4]^-$$ [Chemical Formula 4]

wherein, in Chemical Formula 4,

E is a neutral or cationic Lewis acid;

H is a hydrogen atom;

Z is a Group 13 element;

each A' is the same as or different from each other and each independently represents an aryl group having 6 to 20 carbon atoms or an alkyl group having 1 to 20 carbon atoms, of which one or more hydrogen atoms are substituted with a halogen, a $C_1$ to $C_{20}$ hydrocarbon, an alkoxy, or a phenoxy.

5. The supported metallocene catalyst of claim 1, wherein the carrier is at least one selected from the group consisting of silica, alumina, and magnesia.

6. The supported metallocene catalyst of claim 1, wherein a weight ratio of the transition metal of the metallocene compound to the carrier is 1:10 to 1:1000.

7. A method for preparing polypropylene comprising a step of polymerizing propylene in the presence of the supported metallocene catalyst according to claim 1.

8. The method for preparing polypropylene of claim 7, wherein the polymerization reaction of propylene is carried at a temperature of 25 to 500° C. under a pressure of 1 to 100 kgf/cm² for 1 to 24 hours.

9. The method for preparing polypropylene of claim 7, which is carried out under hydrogen ($H_2$) gas at 30 to 2000 ppm with respect to the weight of propylene.

* * * * *